US008560897B2

(12) United States Patent
Comparan et al.

(10) Patent No.: US 8,560,897 B2
(45) Date of Patent: Oct. 15, 2013

(54) HARD MEMORY ARRAY FAILURE RECOVERY UTILIZING LOCKING STRUCTURE

(75) Inventors: Miguel Comparan, Rochester, MN (US); Mark G. Kupferschmidt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 12/961,947

(22) Filed: Dec. 7, 2010

(65) Prior Publication Data
US 2012/0144253 A1 Jun. 7, 2012

(51) Int. Cl.
*G06F 11/00* (2006.01)
(52) U.S. Cl.
USPC .......................................................... 714/704
(58) Field of Classification Search
USPC .......................................................... 714/704
See application file for complete search history.

(56) References Cited

U.S. PATENT DOCUMENTS

| | | | | |
|---|---|---|---|---|
| 6,467,048 B1* | 10/2002 | Olarig et al. | ................ | 714/6.32 |
| 8,190,951 B2* | 5/2012 | Gille | ............................ | 714/723 |
| 2003/0145257 A1* | 7/2003 | Fields et al. | .................. | 714/704 |
| 2005/0160326 A1* | 7/2005 | Boatright et al. | ............... | 714/47 |
| 2009/0164727 A1* | 6/2009 | Penton et al. | ................. | 711/118 |
| 2010/0058109 A1* | 3/2010 | Chang et al. | ..................... | 714/8 |

* cited by examiner

*Primary Examiner* — Bryce Bonzo
(74) *Attorney, Agent, or Firm* — Patterson & Sheridan LLP (57) ABSTRACT

A technique for managing hard failures in a memory system employing a locking is disclosed. An error count is maintained for units of memory within the memory system. When the error count indicates a hard failure, the unit of memory is locked out from further use. An arbitrary set of error counters are assigned to record errors resulting from access to the units of memory. Embodiments of the present invention advantageously enable a system to continue reliable operation even after one or more internal hard memory failures. Other embodiments advantageously enable manufacturers to salvage partially failed devices and deploy the devices as having a lower-performance specification rather than discarding the devices, as would otherwise be indicated by conventional practice.

17 Claims, 5 Drawing Sheets

HARD MEMORY ARRAY FAILURE RECOVERY UTILIZING LOCKING STRUCTURE

BACKGROUND

The field of the present invention relates to failure recovery in embedded memory arrays in general, and, more specifically, to hard memory array failure recovery utilizing a locking structure.

Processing systems typically comprise memory circuits configured to cache program instructions, program data, and other state information related to executing the program instructions. For example, a central processing unit (CPU) may include an instruction cache for caching the program instructions, a data cache for caching program data, and one or more address translation caches for caching previously computed virtual to physical address mappings associated with the program instructions and program data. Each cache includes an embedded memory fabricated to include a plurality of memory cells. Certain manufacturing flaws may cause one or more individual memory cells from the plurality of memory cells to exhibit failure behavior. The failure behavior may range from a hard failure at the time of manufacture to infrequent soft failures during normal operation. The failure behavior may become worse over time as a result of physical degradation of the one or more individual memory cells, eventually resulting in a hard failure.

Hard failures due to manufacturing flaws are typically detected and affected devices are conventionally discarded. Each discarded device effectively increases the cost of production for each passing device. Failure behavior that develops after a device passes manufacturing tests and is deployed in an end user processing system can produce errors and poor data integrity. Each processing system that includes a failing device may require repair or replacement, which effectively increases the cost of operating the processing system. In each case, failure behavior originating from the one or more individual memory cells is detrimental and costly.

One solution for managing soft errors in memory cells involves generating and checking parity for data stored in arrays of memory cells. If a parity error is detected, then data has been corrupted within the memory cells and the processing system may perform appropriate measures to avoid propagating the corrupted data. Another solution for managing soft errors in memory cells involves generating error correction codes (ECC) when data is written to the array of memory cells and performing error correction when reading the array of memory cells. While ECC techniques represent an adequate solution for managing most soft errors, such as those due to alpha-particle strikes, hard failures still leave the processing system vulnerable to unrecoverable faults and the potential for compromised data integrity. As processing systems increase in size and complexity, and include more processing cores with additional corresponding cache memories, overall system reliability will be detrimentally reduced due to hard failures in the cache memories. Reduced reliability will also lead to additional operating costs.

As the foregoing illustrates, what is needed in the art is a technique for managing hard failures in memory cells comprising cache memories.

SUMMARY

The present invention generally includes a system, article of manufacture and method for managing hard errors in an embedded memory organized as units of storage. Embodiments of the present invention set forth a method for locking out units of storage exhibiting hard failure. The method comprises receiving an access request based on a request address, performing a tag lookup of the request address with respect to a set of stored data address tags, matching the request address to a stored data address tag, accessing a unit of storage corresponding to the request address, determining that an error has occurred as a consequence of accessing the unit of storage, and setting a failed attribute for the unit of storage to preclude future access to the unit of storage.

One advantage of the present invention is that a computation system practicing embodiments of the present invention may continue reliable operation even after one or more internal hard memory failures have occurred within one or more units of storage. Another advantage is that manufacturers may be able to salvage partially failed devices configured to practice embodiments of the invention and to deploy the devices as having a lower-performance specification rather than discarding the devices, as would otherwise be indicated by conventional practice.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
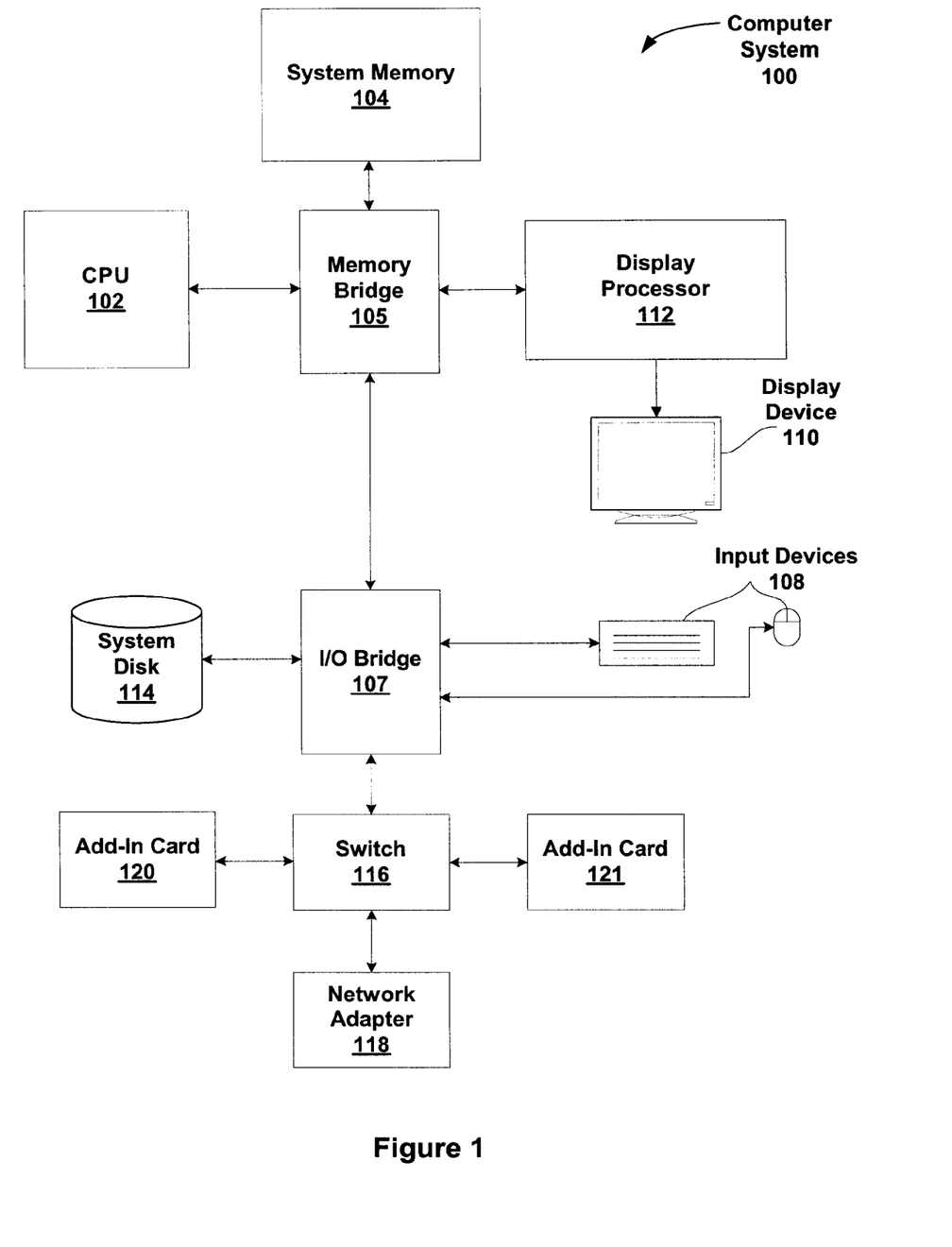
FIG. 1 depicts a computer system, configured to implement one or more aspects of the present invention.

FIG. 1 is a block diagram of a computer system 100 configured to implement one or more aspects of the present invention. The system architecture depicted in FIG. 1 in no way limits or is intended to limit the scope of the present invention. Computer system 100 may be a computer workstation, personal computer, video game console, personal digital assistant, rendering engine, or any other device suitable for practicing one or more embodiments of the present invention.

As shown, computer system 100 includes a central processing unit (CPU) 102 and a system memory 104 communicating via a bus path that may include a memory bridge 105. CPU 102 includes one or more processing cores, and, in operation, CPU 102 controls and coordinates operations of other system components. System memory 104 stores software applications and data for use by CPU 102. CPU 102 runs software applications and optionally an operating system. Memory bridge 105, which may be, for example, a Northbridge chip, is connected via a bus or other communication path (e.g., a HyperTransport link) to an I/O (input/output) bridge 107. I/O bridge 107, which may be, for example, a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics engine and graphics memory. Graphics memory includes a display memory (e.g., a frame buffer) used for storing pixel data for each pixel of an output image. Graphics memory can be integrated in the same device as the graphics engine, connected as a separate device with the graphics engine, and/or implemented within system memory 104.

Display processor 112 periodically delivers pixels to a display device 110 (e.g., a screen or conventional CRT, plasma, OLED, SED or LCD based monitor or television) via a video signal. Additionally, display processor 112 may output pixels to film recorders adapted to reproduce computer generated images on photographic film. Display processor 112 can provide display device 110 with an analog or digital video signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computer system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to computer system 100, via network adapter 118 or system disk 114. The render farm generates one or more rendered images of the scene using the provided instructions and/or data. These rendered images may be stored on computer-readable media in a digital format and optionally returned to computer system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In one embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Computer system 100 may be described in a general context of a computer system with executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

Figure 2:
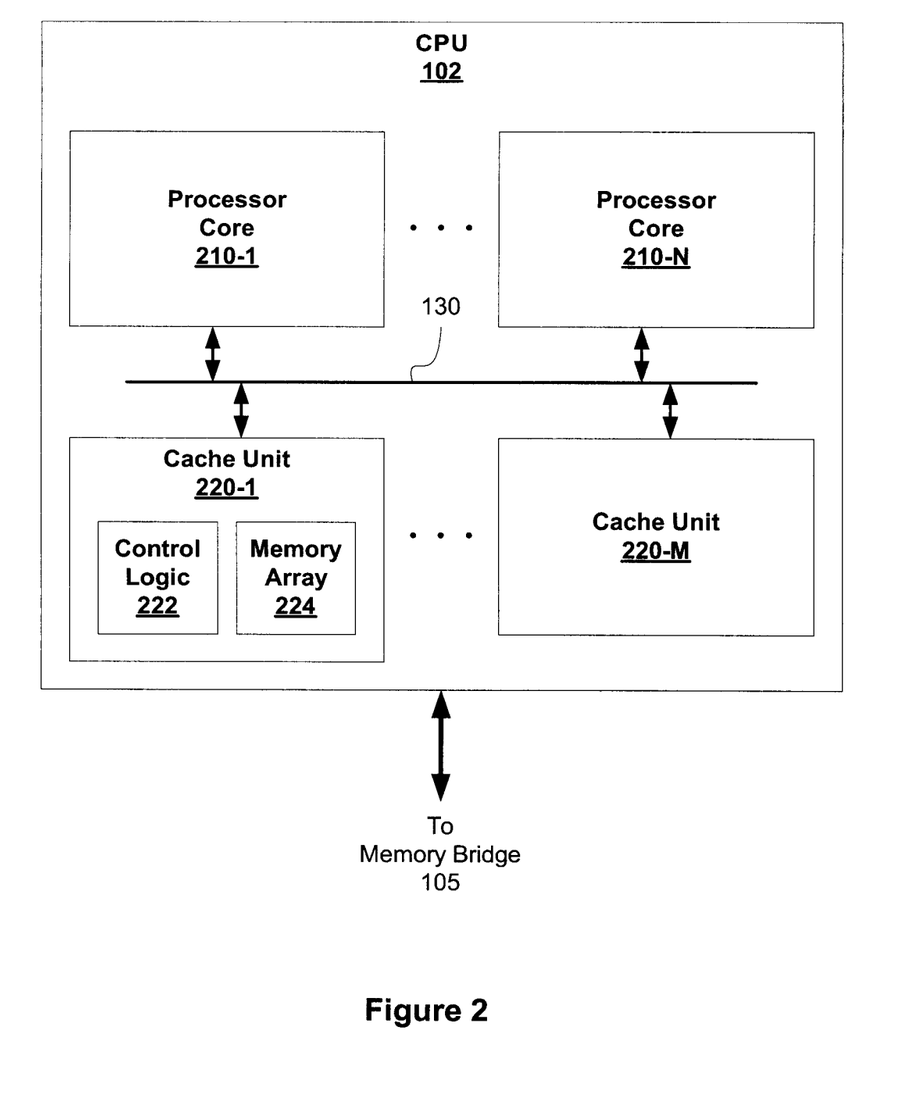
FIG. 2 depicts a central processing unit (CPU) within the computer system, configured to implement one or more aspects of the present invention.

FIG. 2 depicts central processing unit (CPU) 102 within the computer system 100, configured to implement one or more aspects of the present invention. The CPU 102 comprises one or more processor cores 210 configured to execute machine instructions, and one or more cache units 220. The one or more processor cores 210 are coupled to the cache units 220 via an interconnect 130. Each cache unit 220 caches certain data used by the one or more processor cores 210. For example, one cache unit 220 may be configured to cache instructions used by one or more of the processor cores 210. A second cache unit 220 may be configured to cache program data used by the one or more processor cores 210. A third cache unit 220 may cache virtual to physical or effective to physical address mappings.

Each processor core 210 may include one or more additional cache units (not shown), configured to implement a rank of caching between the interconnect 130 and the cache units 220. Persons skilled in the art will recognize that additional caches may also be implemented at different locations within the architecture of the CPU 102. In certain embodiments, cache units 220 may be shared by the one or more processor cores 210, while in other embodiments, certain cache units 220 service only one processor core 210. In an exemplary embodiment, each processor core 210 includes an instruction cache (i-cache), a data cache (d-cache), and an effective-to-real address translation table (ERAT) configured to cache effective address to physical address mappings. Additionally, the CPU 102 may also include a translation look aside buffer (TLB) configured to cache additional address mappings.

Each cache unit 220 comprises control logic 222 and a memory array 224. The memory array 224 is configured to store cached information for the cache unit 220. The memory array 224 comprises storage elements for storing individual bits of information that are organized into units of access. For example, memory array 224 may comprise two thousand forty-eight bits of storage organized as sixty-four units of access or simply "words" of thirty-two bits each. A word address is used to access individual words within the memory array 224. In one embodiment, the memory array 224 implements error correction coding (ECC), whereby additional bits are stored per word to detect and correct errors that may occur within the storage elements of the memory array 224. In another embodiment, the memory array 224 implements error detection via a parity bit stored per word within the memory array 224.

A given memory array may include an arbitrary number of ports. For example, a memory array may be configured to include a write port and a read port. The write port is configured to receive write data, a write word address, and an implementation-specific write enable signal. The write word address selects a specific word to be overwritten by write data upon a write indication from the write enable signal. The read port is configured to transmit read data over a read port in response to a read word address being presented to the memory array. The read word address selects a specific word to be transmitted via the read port as read data. A given word address maps to a set of physical storage elements within the memory array 224. A recurring error associated with a specific word address indicates one or more storage elements is failing within the memory array 224.

The control logic 222 is configured to implement cache lookup and control policies. Cache lookup involves matching a cache query, comprising a query address, against a set of stored tags that include previous query addresses presently being cached. A given tag specifies which data item is associated with a corresponding cache entry. For example, a tag for a data cache entry identifies an address where cached source data resides in a memory hierarchy. A cache query that matches a stored tag indicates that the query address is for a cached item of data. In an ERAT or TLB, the query address represents an effective or virtual memory address and the cached item is a mapped physical address. Persons skilled in the art will understand that different lookup techniques, such as a fully-associative lookup, a direct-mapped lookup, an N-way set associative lookup, or any other technically feasible lookup technique may be implemented without departing the scope and spirit of the present invention.

When a cache entry is occupied by valid data, the cache entry is typically marked valid. A cache entry is typically valid immediately after being loaded with new data via a read or write operation. When a cache entry is not occupied by valid data, the cache entry is marked invalid. A cache entry is typically invalid upon power-up, and when the entry becomes invalidated for any number of reasons, for example to preserve cache coherence in multi-processor settings. A cache entry may be locked to force the cache to retain the cached item. This technique may be used, for example, to retain certain groups of instructions or certain sets of data to guarantee performance of certain software modules. Thus, existing caching techniques provide at least two attributes (valid/invalid, and locked/not-locked) for individual cache entries. A valid cache entry may be locked or unlocked. However, an invalid cache entry is conventionally not permitted to be locked because the combination of attributes has no conventionally useful purpose.

Embodiments of the present invention introduce a new cache entry attribute, described in greater detail below in FIG. 3, whereby a cache entry may be marked with a failed attribute. The failed attribute may be encoded using any technically feasible technique, including an encoding specified as an invalid and locked cache entry. The failed attribute may be applied to any level of granularity. For example, the failed attribute may be applied to individual cache lines or whole "ways" in an N-way cache.

Figure 3:
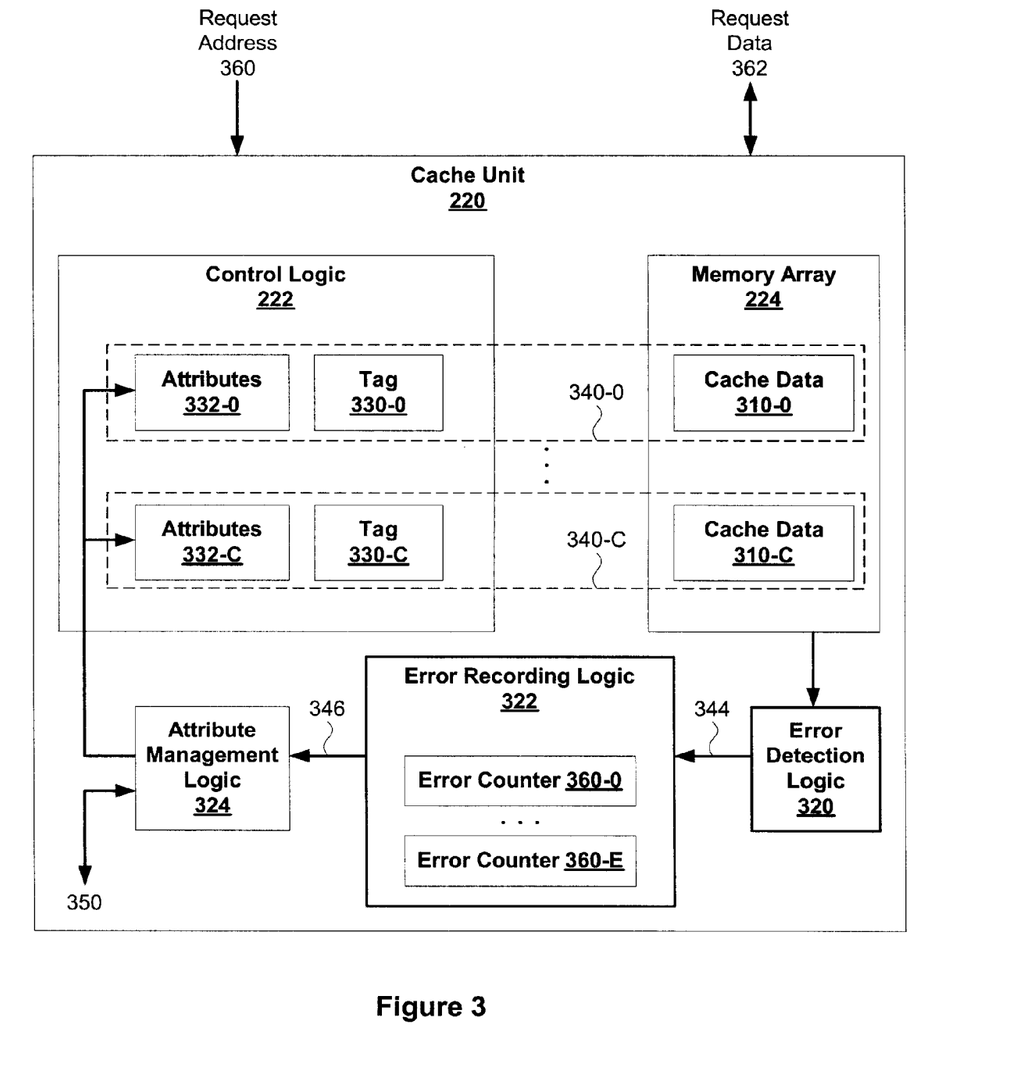
FIG. 3 illustrates a more detailed view of a cache unit within the CPU, according to an embodiment of the present invention.

FIG. 3 illustrates a more detailed view of a cache unit 220 within the CPU 102, according to an embodiment of the present invention. The cache unit 220 includes memory array 224, control logic 222, attribute management logic 324, error recording logic 322, and error detection logic 320. In one embodiment, the cache unit 220 is configured to cache data and locate the data via a request address 360. If a given cache request associated with the request address 360 is a read request and a cache hit, then request data 362 represents the requested read data, cached within cache unit 220. If the cache request is a write, then the request data 362 comprises data to be written into the cache unit 220.

The memory array 224 includes storage elements organized as units of cache data 310. The cache data 310 may comprise an arbitrary number of bits each. In certain embodiments, each cache data 310 comprises a plurality of units of storage, such as bytes, which may be individually addressed according to a base address and an offset. The control logic 222 includes a tag 330 and an attributes register 332 associated with each cache data 310. The control logic 222 also implements cache management, including tag lookup and a replacement policy for allocating storage for newly requested data. A cache entry 340 comprises cache data 310, a tag 330, and attributes 332.

When a request address 360 is posted to the cache unit 220, the control logic 222 performs a lookup of the request address 360 against the tags 330. A matching tag 330 that is valid according to associated attributes 332 indicates cache data 310 comprises the data corresponding to the request address 360. Certain detail has been omitted from the description of cache unit 220 for the sake of clarity, however person skilled in the art will understand the necessary implementation details to practice the teachings herein.

The error detection logic 320 is configured to detect access errors within the memory array 224. For example, the error detection logic 320 may read ECC bits or parity bits to determine that an error has occurred. The error detection logic 320 reports that an error has occurred and the base address where the error occurred via error report signals 344. The base address implicates a specific unit of cache data 310, and related storage elements. The error recording logic 322 is configured to record errors detected by the error detection logic.

In one embodiment, each cache entry 340 has a corresponding error counter 360 within the error recording logic 322. Every error reported for a given base address implicates the corresponding cache entry 310, which indicates an error has occurred in an associated storage element. Each error for each unit of cache data 310 increments an associated error counter 360. In this embodiment, errors for each cache entry may be independently and simultaneously recorded.

In another embodiment, a set of counters within the error recording logic 322 is configured to record errors for an arbitrary set of cache entries 340, where the number of counters is much smaller than the number of cache entries 340. For example, the error recording logic 322 may comprise four error counters 360 for hundreds or thousands of cache entries 340. When an error first occurs in association with a first base address, the base address is recorded and an error count for the base address is set to one. Each time an error occurs, the first base address is compared to the base address of the error. When the first base address matches the error base address, the corresponding error counter 360 is incremented. In this embodiment, errors for a fixed number of cache entries may be recorded.

In yet another embodiment, a set of error counters 360 is configured to count errors associated with each way in an N-way cache, such as an N-way set associative cache. Each way of the cache has a separate error counter 360 configured to record errors reported for the way.

The attribute management logic 324 is configured to set and clear attributes for each cache entry 340. Attributes include valid/invalid, locked/not-locked, dirty/not-dirty, and any other attributes required for a particular implementation. The attribute management logic 324 includes a state access port 350 through which cache entry attributes may be written, read, and otherwise managed by software executing on a corresponding CPU 102. The attribute management logic 324 receives an error data signal 346 from the error recording logic 322, including error count values for each error counter 360.

In one embodiment, a software error management module executing on a corresponding CPU 102 is configured to read error count values via the state access port 350, and reported via the error data signal 346. When the error count for a given cache entry 340 has been reached, storage elements within the corresponding unit cache data 310 are determined to have failed and the software error management module instructs the attribute management logic 324 to set a failed attribute for the cache entry 340. The failed attribute may be represented a cache entry 340 that is both invalid and locked, an otherwise unused attribute state combination. The software error management module may use any technically feasible technique for determining that cache entry 340 has failed, including a simple error count threshold, or an error count threshold within a specific time window.

In another embodiment, a hardware error management module is implemented within the attribute management logic 324. When the error count for a given cache entry 340 has been reached, storage elements within the corresponding unit cache data 310 are determined to have failed and the attribute management logic 324 sets a failed attribute for the cache entry 340. The failed attribute may be represented a cache entry 340 that is both invalid and locked, an otherwise unused attribute state combination. The attribute management logic 324 may use any technically feasible technique for determining that cache entry 340 has failed, including a simple error count threshold, or an error count threshold within a specific time window.

Figure 4:
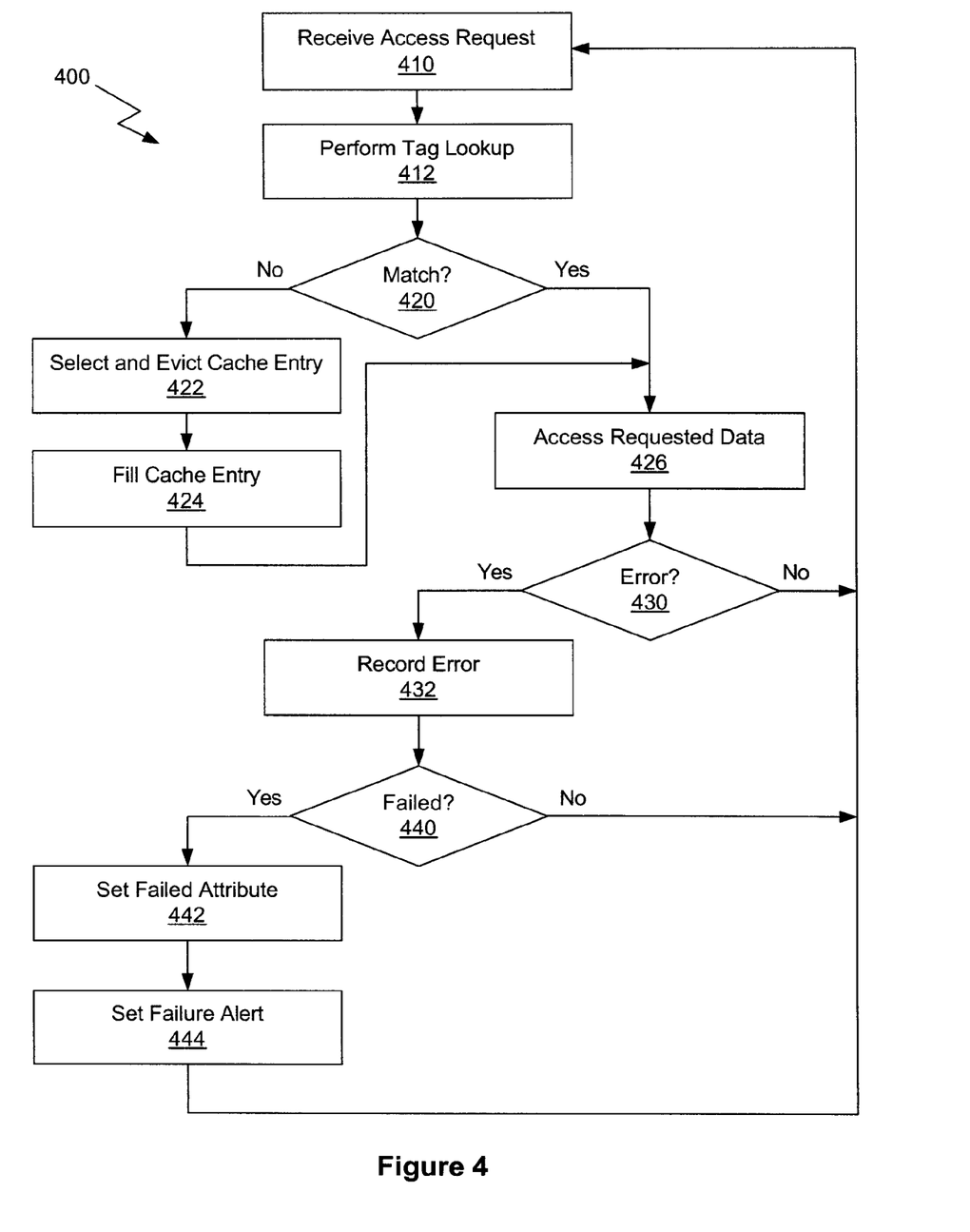
FIG. 4 is a flow diagram of method steps for setting a failed attribute for elements within a storage array, according to one embodiment of the invention.

FIG. 4 is a flow diagram of method steps 400 for setting a failed attribute for elements within a storage array, according to one embodiment of the invention. Although the method steps are described in conjunction with the systems of FIGS. 1-3, persons skilled in the art will understand that any system configured to perform the method steps, in any order, is within the scope of the invention.

The method begins in step 410, where cache unit 220 of FIG. 2, receives an access request comprising a request address. In one embodiment, the access request is a read or write request for data residing in an associated memory system. In another embodiment, the access request is a request for an address mapping, such as an effective-to-physical or virtual-to-physical address mapping. In step 412, control logic 222 within the cache unit 220 performs a tag lookup based on the request address. As discussed previously in FIG. 3, any technically feasible lookup technique may be implemented, including a fully-associative lookup, a direct-mapped lookup, and intermediate variations such as an N-way associative lookup. If, in step 420, the tag lookup yields a match, then the method proceeds to step 426, where the cache unit 220 accesses requested data. The access to requested data may be a read or write request for data stored within memory array 224.

If, in step 430, an error is detected while accessing the requested data, then the method proceeds to step 432, where the error recording logic 322 of FIG. 3 records the error. In one embodiment, each unit of cache data 310 has a corresponding error counter 360 within the error recording logic 322. In such an embodiment, each error is directed to the corresponding error counter 360 for recording. In alternative embodiments, the error recording logic 322 implements fewer error counters 360 than units of cache data 310. In such alternative embodiments, the process of recording an error is described in greater detail in FIG. 5.

If, in step 440, a cache entry 340 corresponding to the error is deemed to have failed, then the method proceeds to step 442. In one embodiment, an error count threshold is used to make a failure determination. However, as discussed previously in FIG. 3, any technically feasible technique may be used to make a failure determination. In step 442 a failure attribute is set for the cache entry 340 associated with the failure determination. With the failure attribute set, the failed cache entry 340 is not allocated for future use. In step 444, the cache unit 220 sets a failure alert for the failed cache entry 340. In one embodiment, a software error management module is notified by the failure alert. After the failure alert is set, the method proceeds back to step 410.

Returning to step 420, if the tag lookup does not yield a match, then the method proceeds to step 422, where control logic 222 selects a cache entry 340 for eviction and the cache unit 220 evicts the selected cache entry 340. A cache entry may be selected for eviction using any technically feasible technique. For example, a least recently used (LRU) eviction policy may be used. In one embodiment, a data cache entry 340 that is marked dirty may need to be written back to backing storage to complete eviction of the cache entry 340.

In step 424, the selected cache entry 340 is filled with data associated with the request. In one embodiment, a data cache entry 340 is filled with data from an associated address from backing storage. In another embodiment, an address mapping cache is filled with an address mapping, such as an effective-to-physical or virtual-to-physical address mapping. The method then proceeds to step 426.

Returning to step 430, if an error is not detected while accessing the requested data, then the method proceeds to back to step 410.

Returning to step 440, if a cache entry 340 corresponding to the error is not deemed to have failed, then the method proceeds back to step 410.

The method may continue in operation for as long as CPU 102 of FIG. 1 is in operation.

Figure 5:
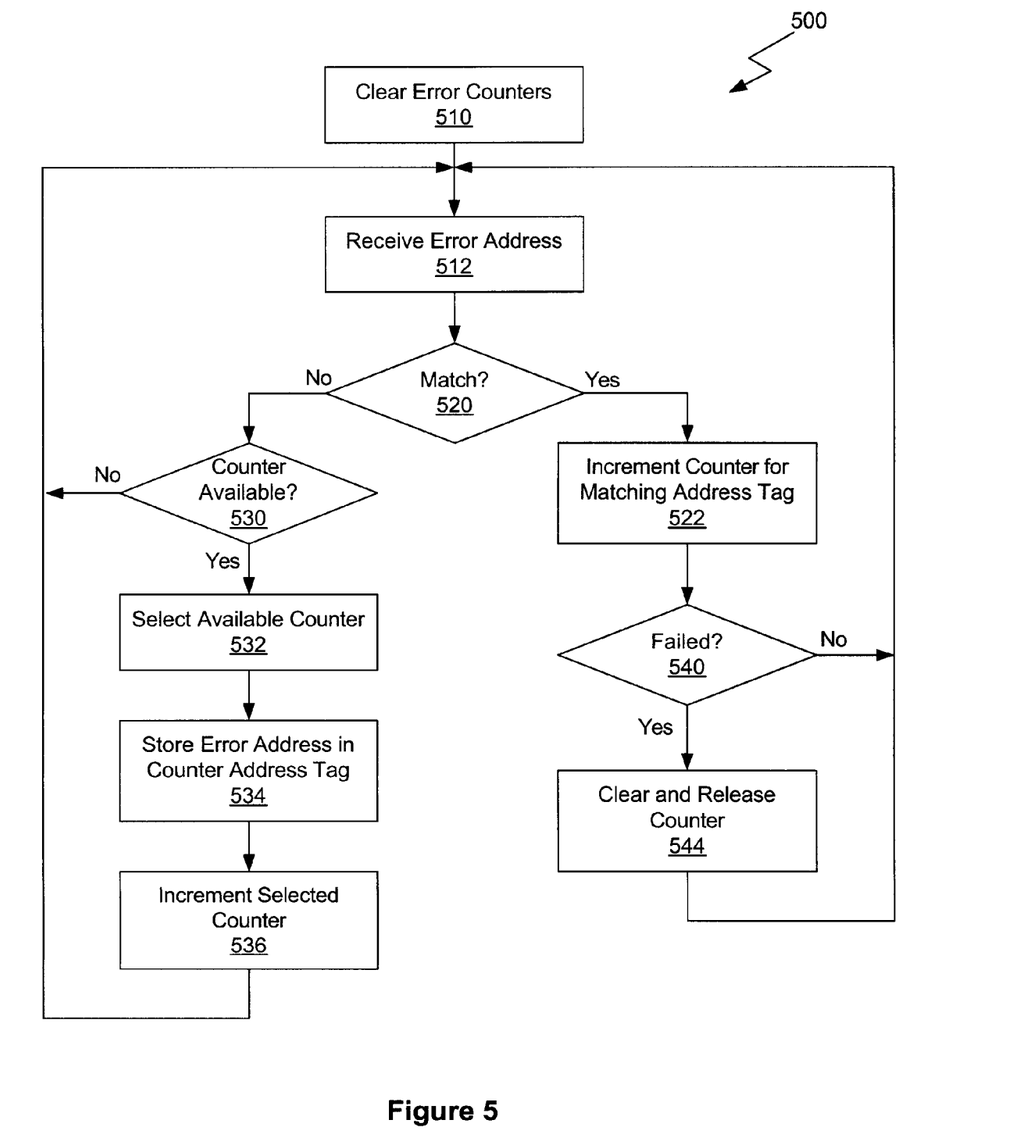
FIG. 5 is a flow diagram of method steps for counting failures with an arbitrary set of failure counters, according to one embodiment of the invention.

FIG. 5 is a flow diagram of method steps 500 for counting failures with an arbitrary set of failure counters, according to one embodiment of the invention. Although the method steps are described in conjunction with the systems of FIGS. 1-3, persons skilled in the art will understand that any system configured to perform the method steps, in any order, is within the scope of the invention. In certain embodiments, a set of error counters 360 of FIG. 3 are configured to include an address tag and an error count. The address tag associates a specific error counter 360 to a specific block of data within the memory array 224 via a base address for the block of data. When an error is detected, the base address associated with the error comprises an error address. A lookup operation attempts to match the error address with a set of address tags within each error counter 360. On a match, the corresponding error counter 360 is incremented, as described in greater detail below.

The method begins in step 510, where the error recording logic 322 clears a set of error counters 360. Each error counter 360 is configured to count errors using an arbitrary number of bits to each store an error count. In step 512, the error recording logic 322 receives an error signal comprising an error address for a unit of cache data 310. If, in step 520, the error address matches an address tag associated with a specific error counter 360, then the method proceeds to step 522, where error recording logic 322 increments the error counter 360 associated with the matching address tag.

If, in step 540, the cache entry 340 associated with the error address is deemed to have failed, then the method proceeds to step 544. In step 544, the error recording logic 322 clears the error counter 360 and releases it for use in recording errors associated with a different cache entry 340.

Returning to step 520, if the error address does not match an address tag associated with a specific error counter 360, then the method proceeds to step 530. If, in step 530, an error counter 360 is available, then the method proceeds to step 532, where the error recording logic 322 selects an available error counter 360. Any technically feasible technique may be used to select the available error counter 360. In step 534, the error recording logic 322 stores the error address in a counter address tag. In step 536, the error recording logic 322 increments the selected error counter 360.

Returning to step 540, if the cache entry 340 associated with the error address is not deemed to have failed, then the method proceeds back to step 512.

Returning to step 530, if no error counter 360 is available, then the method proceeds back to step 512. Persons skilled in the art will recognize that a scenario involving more failed cache entries 340 than error counters 360 will result in the failed cache entries 340 being marked as failed until all failed cache entries 340 are marked and the system may ultimately continue proper execution. Under normal operating conditions, however, failed cache entries 340 should be rare. Furthermore, a number of error counters 360 may selected to minimize a likelihood that all error counters 360 are in use at any one time.

Persons skilled in the art will understand that, although the methods of FIGS. 4 and 5 are described with respect to cache unit 220, any memory system involving lockable units of memory are within the scope of the present invention.

Furthermore, the techniques disclosed herein may be practiced in conjunction with a power-on process, a manufacturing process, a component-binning process, or any combination thereof.

In sum, a technique is disclosed for managing hard failures in a memory system such as embedded cache system. An error count is associated with certain units of storage within the memory system. When an error is detected for a specific unit of storage, an associated error count records the error as an incremented error count value. When the error count for the unit of storage exceeds a certain failure threshold, the unit of storage is deemed to have failed. The failed unit of storage is marked with a failed attribute, which precludes the failed unit of storage from future use. The failed attribute may be implemented using any technique, including an explicit attribute bit, or an otherwise unused combination of other attributes, such as a combination of both "invalid" and "locked" attributes. An error counter implemented using digital logic may be used to store and record the error count for a unit of storage. In one embodiment, each unit of storage has a corresponding error counter. In an alternative embodiment, an error counter is allocated to a unit of storage exhibiting one or more errors. If the unit of storage accumulates enough errors and fails, then the associated error counter is cleared and may be allocated to a different unit of storage. The disclosed techniques for managing hard failures in a memory system are particularly useful in embedded random access memories (RAMs), such as RAMs associated with embedded data, instruction, and address mapping caches.

One advantage of the present invention is that a computation system practicing embodiments of the present invention may continue reliable operation even after one or more internal hard memory failures. Another advantage is that manufacturers may be able to salvage partially failed devices configured to practice embodiments of the invention and to deploy the devices as having a lower-performance specification rather than discarding the devices, as would otherwise be indicated by conventional practice.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the foregoing is directed to embodiments of the present invention, other and further embodiments of the invention may be devised without departing from the basic scope thereof, and the scope thereof is determined by the claims that follow.

What is claimed is:

1. A processor unit comprising:
a processor core configured to execute instructions; and
a cache unit coupled to the processor core, comprising:
 a memory array organized as units of storage;
 a plurality of error counters, wherein each error counter corresponds exclusively to a respective unit of storage; and
 management logic configured to:
  receive an access request based on a request address;
  perform a tag lookup of the request address with respect to a set of stored data address tags;
  match the request address to a stored data address tag;
  access a unit of storage corresponding to the request address;
  determine that an error has occurred as a consequence of accessing the unit of storage;
  record the error in an error counter; and
  set a failed attribute for the unit of storage to preclude access to the unit of storage.

2. The processor unit of claim 1, wherein the unit of storage is a cache line, and to perform a tag lookup, the management logic performs a fully associative pattern match between the request address and the set of stored data address tags.

3. The processor unit of claim 1, wherein the unit of storage is a way in an N-way set associative cache, and to perform a tag lookup, the management logic performs an N-way set associative pattern match between the request address and the set of stored data address tags.

4. The processor unit of claim 1, wherein the management logic is further configured to determine that the unit of storage has failed based on an error count associated with the error counter.

5. The processor unit of claim 4, wherein a different error counter of the plurality of error counters is associated with each unit of storage, and to record, the management logic is configured to increment one error counter of the plurality of error counters.

6. The processor unit of claim 4, wherein to record, the management logic is configured to:
 receive an error address that corresponds to the unit of storage;

perform a tag lookup of the error address within a set of error address tags, wherein each error address tag has a corresponding error counter;

determine that the error address matches a first error address tag; and increment an error counter corresponding to the first error address tag.

7. The processor unit of claim 6, wherein the management logic is further configured to clear the error counter and disassociate the error counter from the failed unit of storage.

8. The processor unit of claim 1, wherein the management logic is further configured to:

receive an error address that corresponds to a unit of storage;

perform a tag lookup of the error address within a set of error address tags, wherein each error address tag has a corresponding error counter;

determine that the error address does not match an error address tag;

select an error counter and store the error address in an error address tag associated with the selected error counter; and increment the selected error counter.

9. A computer system, comprising:

a memory bridge;

a system memory coupled to the memory bridge;

a mass storage system coupled to the memory bridge;

a processing unit comprising:

a processor core configured to execute instructions; and a cache unit coupled to the processor core, comprising:

a memory array organized as units of storage;

a plurality of error counters, wherein each error counter corresponds exclusively to a respective unit of storage; and management logic configured to:

receive an access request based on a request address;

perform a tag lookup of the request address with respect to a set of stored data address tags;

match the request address to a stored data address tag;

access a unit of storage corresponding to the request address;

determine that an error has occurred as a consequence of accessing the unit of storage;

record the error in an error counter; and set a failed attribute for the unit of storage to preclude access to the unit of storage.

10. The computer system of claim 9, wherein the unit of storage is a cache line, and to perform a tag lookup, the management logic performs a fully associative pattern match between the request address and the set of stored data address tags.

11. The computer system of claim 9, wherein the unit of storage is a way in an N-way set associative cache, and to perform a tag lookup, the management logic performs an N-way set associative pattern match between the request address and the set of stored data address tags.

12. The computer system of claim 9, wherein the management logic is further configured to determine that the unit of storage has failed based on an error count associated with the error counter.

13. The computer system of claim 12, wherein a different error counter of the plurality of error counters is associated with each unit of storage, and to record, the management logic is configured to increment one error counter of the plurality of error counters.

14. The computer system of claim 12, wherein to record, the management logic is configured to:

receive an error address that corresponds to the unit of storage;

perform a tag lookup of the error address within a set of error address tags, wherein each error address tag has a corresponding error counter;

determine that the error address matches a first error address tag; and increment an error counter corresponding to the first error address tag.

15. The computer system of claim 14, wherein the management logic is further configured to clear the error counter and disassociate the error counter from the failed unit of storage.

16. The computer system of claim 9, wherein the management logic is further configured to:

receive an error address that corresponds to a unit of storage;

perform a tag lookup of the error address within a set of error address tags, wherein each error address tag has a corresponding error counter;

determine that the error address does not match an error address tag;

select an error counter and store the error address in an error address tag associated with the selected error counter; and increment the selected error counter.

17. A processor unit comprising:

a processor core configured to execute instructions; and a cache unit coupled to the processor core, comprising:

a memory array organized as units of storage; and management logic configured to:

receive an access request based on a request address;

perform a tag lookup of the request address with respect to a set of stored data address tags;

match the request address to a stored data address tag;

access a unit of storage corresponding to the request address;

determine that an error has occurred as a consequence of accessing the unit of storage;

record the error in an error counter associated with the unit of storage;

determine that the unit of storage has failed based on an error count associated with the error counter;

set a failed attribute for the unit of storage to preclude access to the unit of storage; and clear the error counter and disassociate the error counter from the failed unit of storage, wherein recording the error comprises:

receiving an error address that corresponds to the unit of storage;

performing a tag lookup of the error address within a set of error address tags, wherein each error address tag has a corresponding error counter;

determining that the error address matches a first error address tag; and incrementing an error counter corresponding to the first error address tag.

* * * * *